United States Patent
Honma et al.

(10) Patent No.: US 7,535,834 B2
(45) Date of Patent: May 19, 2009

(54) NODE DEVICE CONFIGURING RING NETWORK AND DATA FRAME CONTROL METHOD

(75) Inventors: Hiroyuki Honma, Kawasaki (JP); Satoru Saitoh, Kawasaki (JP); Kazuto Nishimura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 743 days.

(21) Appl. No.: 11/249,471

(22) Filed: Oct. 14, 2005

(65) Prior Publication Data

US 2006/0280122 A1   Dec. 14, 2006

(30) Foreign Application Priority Data

Jun. 10, 2005   (JP)   ............... 2005-170504

(51) Int. Cl.
*G01R 31/08*   (2006.01)

(52) U.S. Cl. ...................... 370/229; 370/404

(58) Field of Classification Search ............ None
See application file for complete search history.

(56) References Cited

U.S. PATENT DOCUMENTS

| | | | |
|---|---|---|---|
| 6,760,774 B1 | 7/2004 | Soumiya et al. | |
| 7,139,293 B1 * | 11/2006 | Essen | .................. 370/545 |
| 7,369,504 B2 * | 5/2008 | Davis | ................. 370/236.1 |
| 7,397,813 B2 * | 7/2008 | Choe et al. | .................. 370/438 |
| 2001/0019554 A1 | 9/2001 | Nomura et al. | |
| 2003/0076781 A1 * | 4/2003 | Enomoto et al. | ............. 370/229 |
| 2003/0233579 A1 | 12/2003 | Kimura et al. | |
| 2004/0151172 A1 | 8/2004 | Notani et al. | |
| 2004/0170184 A1 | 9/2004 | Hashimoto | |
| 2005/0041595 A1 * | 2/2005 | Uzun et al. | .................. 370/252 |
| 2005/0157646 A1 * | 7/2005 | Addagatla et al. | ............ 370/232 |

FOREIGN PATENT DOCUMENTS

| | | |
|---|---|---|
| JP | A-2000-244507 | 9/2000 |
| JP | A-2001-251343 | 9/2001 |
| JP | A-2004-23480 | 1/2004 |
| JP | A-2004-236205 | 8/2004 |
| JP | A-2004-242194 | 8/2004 |
| JP | A-2004-289799 | 10/2004 |
| JP | A-2004-312672 | 11/2004 |
| WO | W/O 2004/073262 A1 | 8/2004 |
| WO | WO 2004/095779 | 11/2004 |
| WO | WO 2004/109985 A1 | 12/2004 |
| WO | WO 2005/015851 A1 | 2/2005 |

* cited by examiner

*Primary Examiner*—Phirin Sam
(74) *Attorney, Agent, or Firm*—Staas & Halsey LLP

(57) ABSTRACT

When an externally received data frame is transmitted at a station of a ring-shaped packet communication network, a congestion point in the communication network is defined as a boundary point, a frame addressed to a station located before the boundary point is transmitted at a first transfer rate, and a frame addressed to a station located after the boundary point is transmitted at a second transfer rate lower than the first transfer rate.

9 Claims, 19 Drawing Sheets

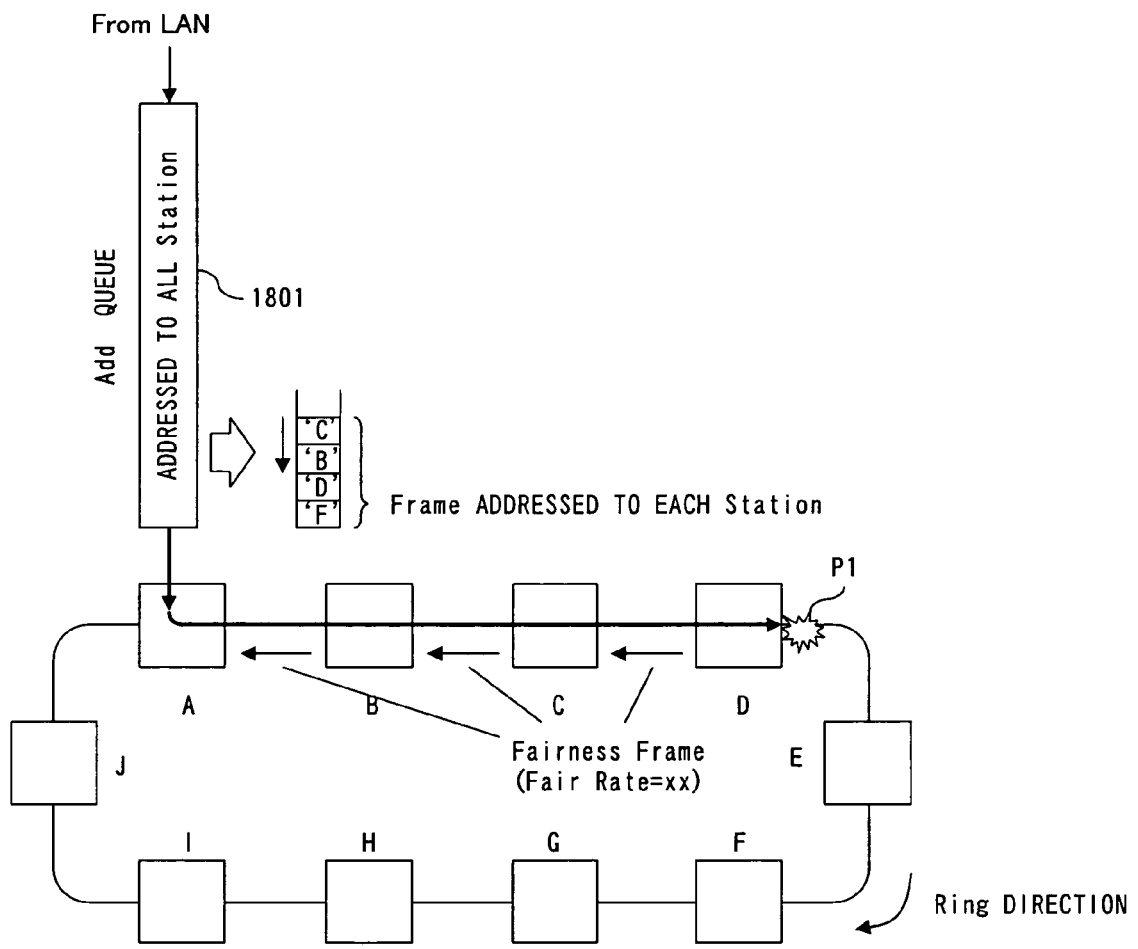
F I G. 1 A

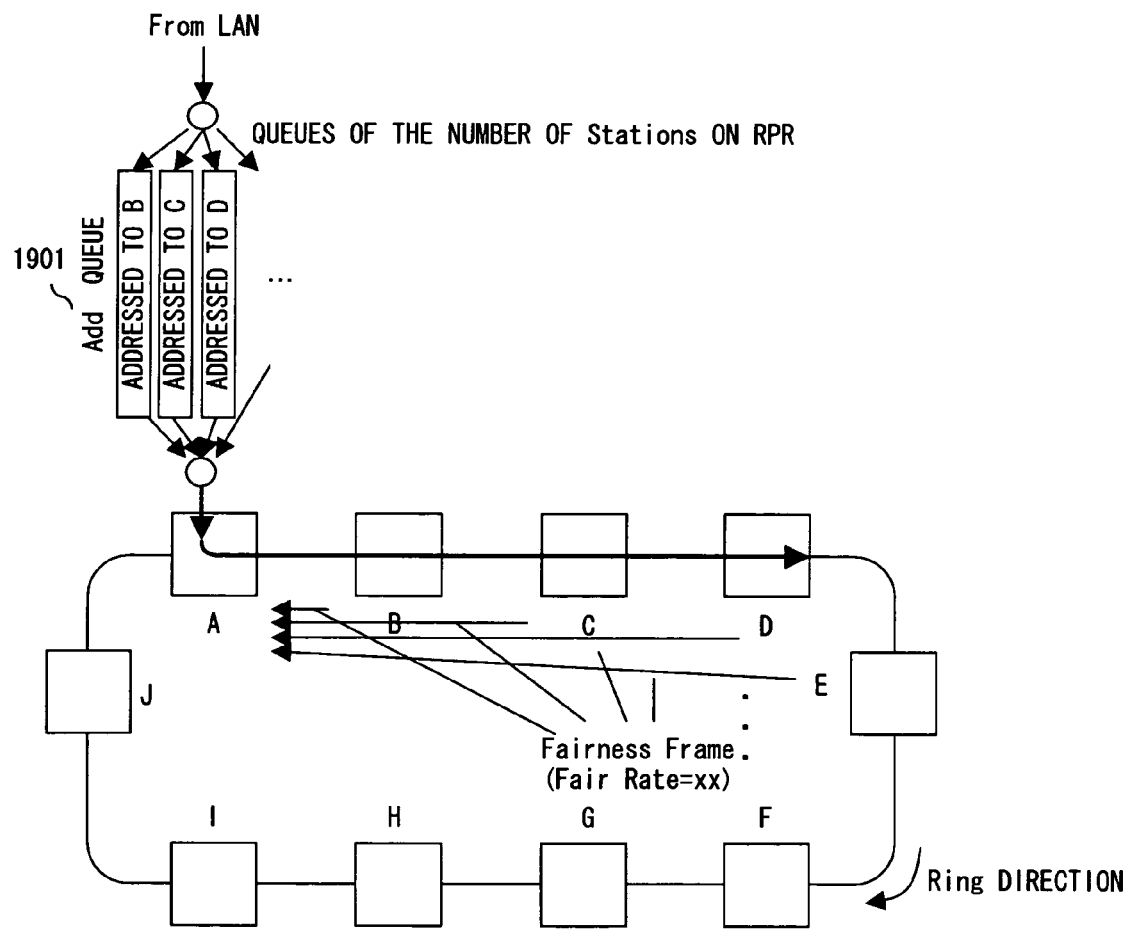
F I G. 1B

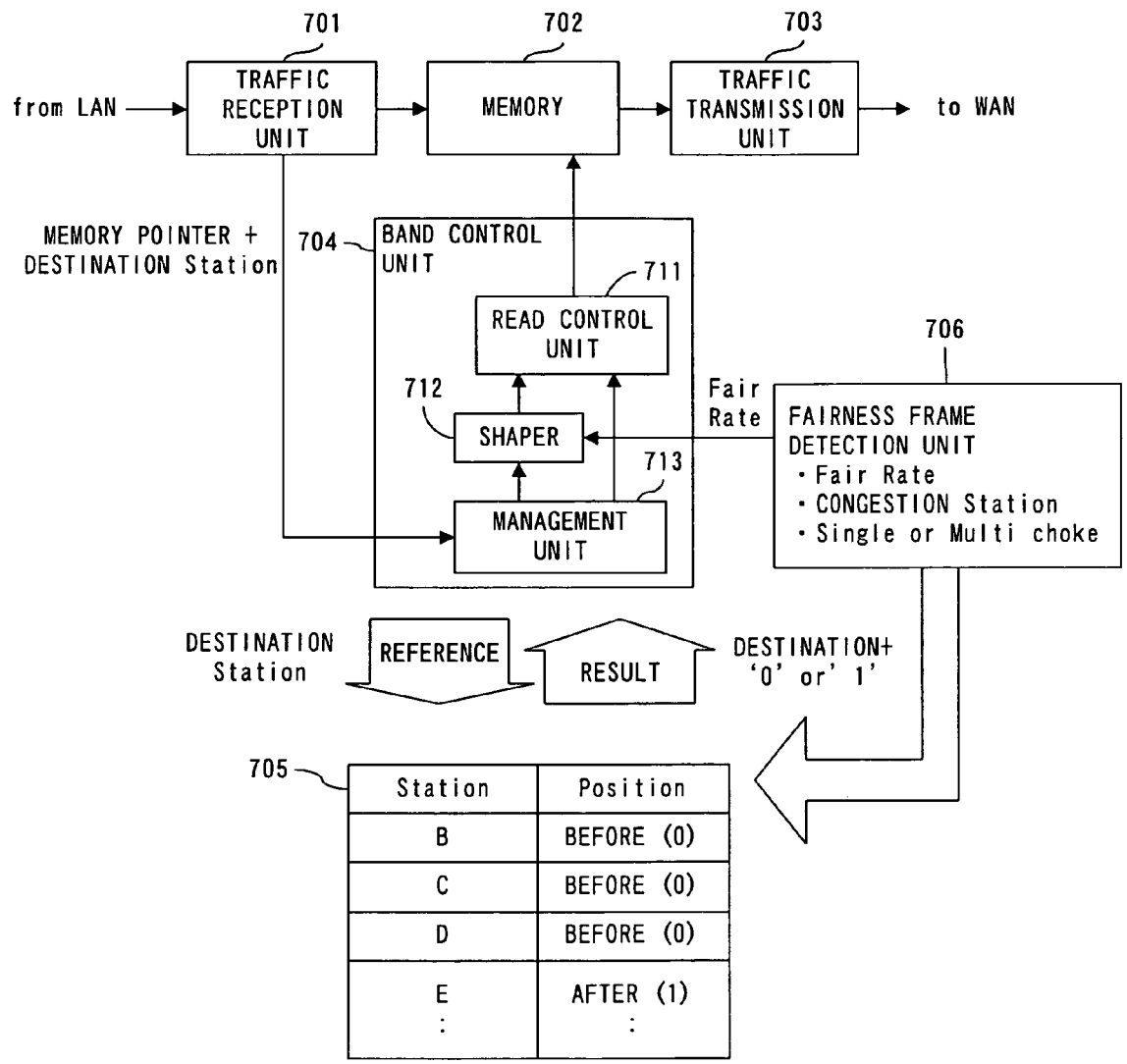
F I G. 7

| BOUNDARY POINT TIME | BETWEEN G AND H |
|---|---|
| | WHEN CONGESTION BETWEEN G AND H IS max |

F I G. 9

NODE DEVICE CONFIGURING RING NETWORK AND DATA FRAME CONTROL METHOD

BACKGROUND OF THE INVENTION

1. Field of the Invention

The present invention relates to fairness control for fair use of the bands of data traffic among stations in a ring-shaped packet communication network such as a RPR (resilient packet ring), etc.

2. Description of the Related Art

An efficient and quick-acting fairness control is requested when traffic congestion takes place in a conventional RPR network (for example, refer to the following patent documents 1 and 2). The RPR and fairness control are standardized by IEEE (Institute of Electrical and Electronic Engineers) 802.17.

Patent Document 1: Japanese Published Patent Application No. 2004-289799

Patent Document 2: Japanese Published Patent Application No. 2004-312672

FIG. 1A shows an example of an RPR network for performing fairness control in a single choke system. The RPR is structured by stations A through J connected in a ring-shaped form. Each station has an add queue 1801, and accumulates a frame passing a congestion point P1 in the add queue 1801. The accumulation time is determined by the fair rate announced in the fairness frame. Under such control, fairness can be realized among the stations.

In this system, a fairness frame is transmitted from each station to only an adjacent upstream station in the direction inverse to the data traffic direction (ring direction). The upstream station determines a fair rate to be announced to a station upper by one stage based on the fair rate of the upstream station and the fair rate announced by a downstream station. For example, only the fair rate at the heaviest congestion point is announced to the station upper by one stage.

FIG. 1B shows an example of an RPR network for performing fairness control in a multichoke system. Each station has add queues 1901 of the number of stations on the RPR, and controls each add queue according to fair rate for each destination station. Thus, the fairness among the stations and effective use of bands can be realized.

In this system, a fairness frame is broadcast from each station to all other stations. Therefore, each station is informed of the fair rate of all stations on the RPR. Each station calculates the possible transmission rate to each of the other stations, and transmits a frame from each add queue based on the calculated value.

However, there is the following problem with the above-mentioned conventional fairness control.

Since there is only one type of add queue in the single choke system, the rate of the frame passing a congestion point is decreased when congestion occurs on the RPR. Therefore, the rate of a frame not passing the congestion point (not related to congestion) is also decreased. Therefore, the bands cannot be effectively utilized. This phenomenon is referred to as a head of line blocking.

For example, in the example shown in FIG. 1A, by a frame addressed to the station F accumulated in the add queue 1801, all frames including those addressed to the subsequent stations D, B, and C are accumulated. In this case, since the frames addressed to the stations D, B, and C do not pass the congestion point P1, they are not related to congestion originally.

In the multichoke system, since each station has add queues of the number of all stations on the RPR, and realizes fairness control by dividing the RPR, the configuration of each station is large and the controlling operation is considerably complicated. Therefore, it is not a practical control method.

SUMMARY OF THE INVENTION

The present invention aims at realizing fairness control in a simple configuration capable of efficiently utilizing bands when congestion occurs in a ring-shaped packet communication network such as an RPR, etc.

The first node device according to one preferred mode of the present invention includes a reception device, a storage device, a control device, and a transmission device, and adds a frame external to a ring-shaped packet communication network formed by a plurality of stations which transfer a data frame, to the communication network at a station in the communication network.

The reception device receives an external frame, and the storage device stores the received frame. The control device reads from the storage device at a first transfer rate a frame addressed to a station located before a boundary point which is a congestion point on the communication network, and reads a frame addressed to a station located after the boundary point from the storage device at a second transfer rate lower than the first transfer rate. The transmission device transmits the read frames to the communication network.

A second node device according to one preferred mode of the present invention includes a reception device, first and second storage devices, and a control device, and adds a frame external to a ring-shaped packet communication network formed by a plurality of stations which transfer a data frame, to the communication network at a station in the communication network.

The reception device receives an external frame. The first storage device transfers a stored frame to the ring-shaped packet communication network at a first transfer rate. The second storage device transfers a stored frame at a second transfer rate lower than the first transfer rate to the ring-shaped packet communication network. The control device stores an external frame addressed to a station located before a boundary point which is a congestion point in the communication network in the first storage device, and stores an external frame addressed to a station located after the boundary point in the second storage device.

BRIEF DESCRIPTION OF THE DRAWINGS

FIG. 1A shows a single choke system;

FIG. 1B shows a multichoke system;

FIG. 7 shows the configuration of the node device;

FIG. 9 shows the control method 1;

DETAILED DESCRIPTION OF THE PREFERRED EMBODIMENTS

The best modes for embodying the present invention are described below in detail by referring to the attached drawings.

Figure 2:
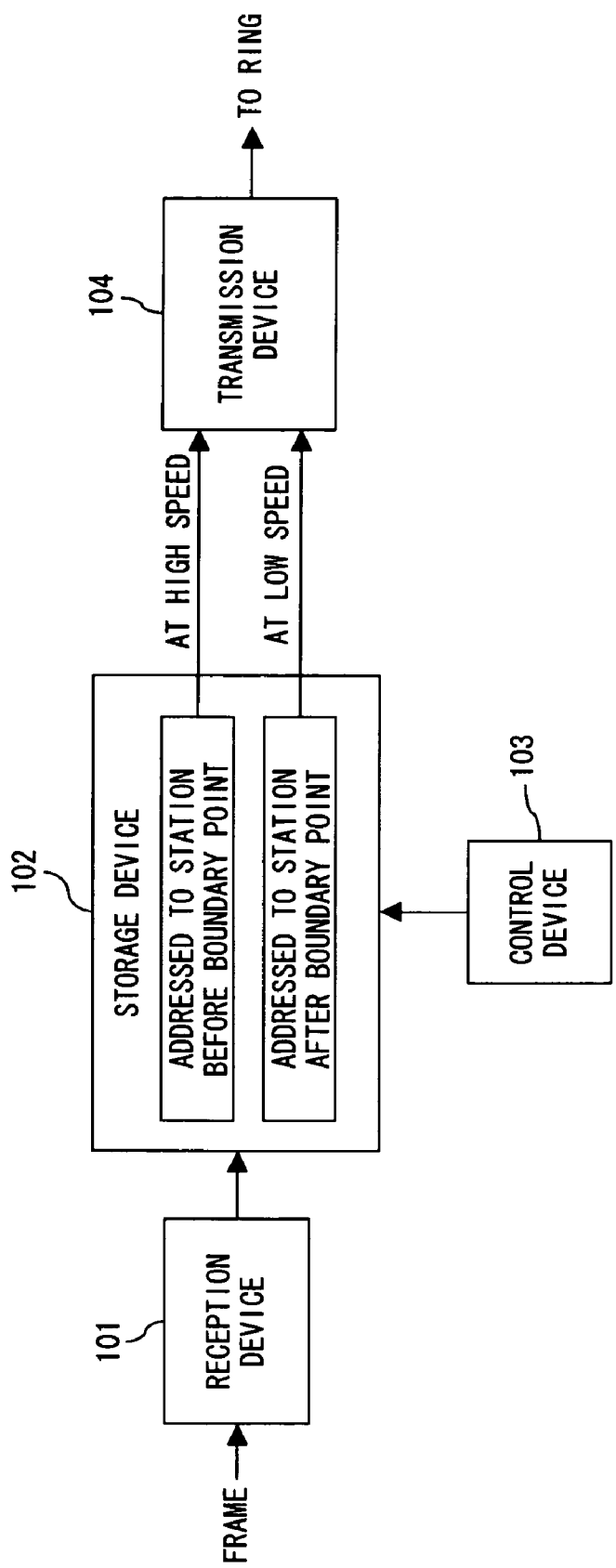
FIG. 2 shows the principle of the node device according to the present invention.

FIG. 2 shows the principle of the node device according to the present invention. The node device shown in FIG. 2 comprises a reception device 101, a storage device 102, a control device 103, and a transmission device 104, and adds a frame external to a ring-shaped packet communication network formed by a plurality of stations which transfer a data frame, to the communication network at a station in the communication network.

The reception device 101 receives an external frame, and the storage device 102 stores a received frame. The control device 103 reads from the storage device 102 at a first transfer rate a frame addressed to a station located before a boundary point which is a congestion point in the communication network, and reads a frame addressed to a station located after the boundary point from the storage device 102 at a second transfer rate lower than the first transfer rate. The transmission device 104 transmits the read frames to the communication network.

The storage device 102 can be configured by a first storage device for reading a frame at the first transfer rate and a second storage device for reading a frame at the second transfer rate so that a received frame can be stored in the first storage device or the second storage device depending on the station to which the frame is transmitted.

At this time, the control device can be configured to change the first and second transfer rates for transfer of a frame stored in the first and second storage devices to a ring network depending on the fair rate transferred from another station.

Under the above-mentioned control, a frame addressed to a station located before a congestion point as viewed from the station in which the node device is mounted can be transmitted to the ring at the high-speed first transfer rate without an influence of existing congestion. On the other hand, a frame transferred to a station beyond the congestion point is transmitted to the ring at the low-speed second transfer rate. Therefore, congestion can be controlled efficiently using the bands on the ring.

As the first transfer rate, for example, a full rate corresponding to the upper limit of the traffic which can be added by the node device is used. As the second transfer rate, for example, a fair rate announced through a fairness frame from a downstream station is used.

The reception device 101, the storage device 102, the control device 103, and the transmission device 104 respectively correspond to, for example, a traffic reception unit 701, memory 702, a band control unit 704, and a traffic transmission unit 703 described later and shown in FIG. 7.

According to the present invention, the bands are not narrowed for the traffic not relating to a congestion point, and a frame can be transmitted on a ring at a full rate. Therefore, no "head of line blocking" occurs, and the bands on the ring can be efficiently used.

Regardless of the number of stations on the ring, the traffic can be classified into two types and managed. Therefore, the fairness control can be realized in a simple configuration.

In the present embodiment, the point where there is congestion in the RPR (congestion point) is defined as a boundary point, and the traffic to be added to the RPR is classified into two groups depending on the position of the destination, that is, the position before or after the boundary point. Then, add queues are provided as two types of storage devices corresponding to the respective groups in each station on the ring.

One add queue is used for the traffic addressed to a station before the boundary point on the ring, and the other add queue is used for the traffic addressed to a station after the boundary point. A frame is read at a full rate from the queue for the traffic addressed to a station before the boundary point, and a frame is read at a fair rate announced by the fairness frame from the queue for the traffic addressed to a station after the boundary point.

To dynamically change the control of an add queue when a congestion point is changed, a position management table storing the information whether each station on the RPR is located before or after the boundary point is provided. By referring to the table, a queue is assigned for each traffic group.

Thus, a queue can be dynamically assigned by simple control, and the assignment of a queue can be immediately changed only by changing the position management table although a congestion point is changed.

Figure 3A:
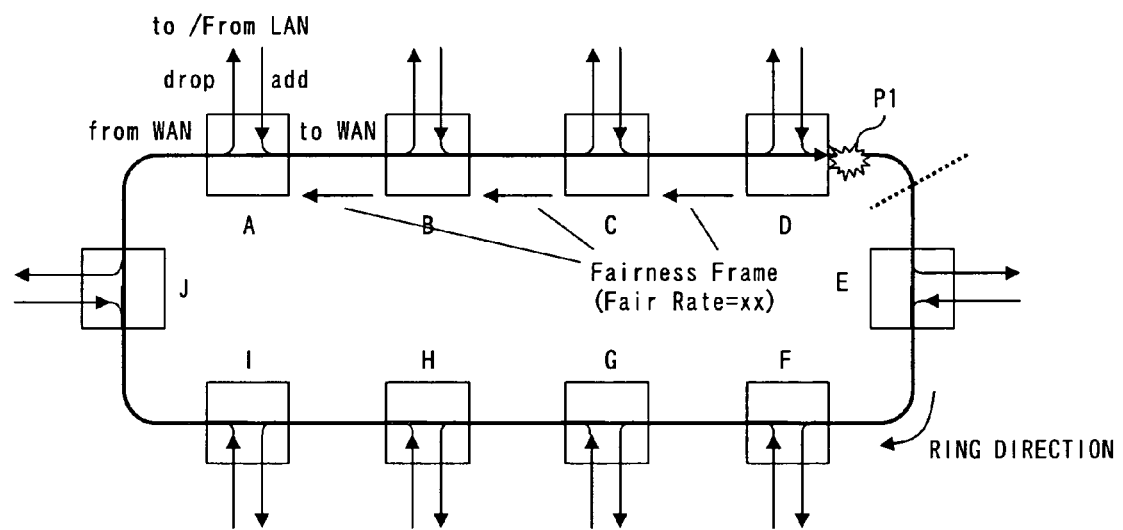
FIG. 3A shows an RPR network.

FIG. 3A shows an example of an RPR network for performing the above-mentioned fairness control. The RPR corresponds to a WAN (wide area network) comprising the stations A through J connected in a ring shape. Each station defines a congestion point P1 between the stations D and E as a boundary point, and classifies another station into a group before or after the boundary point. For example, in the station A, a frame is added or dropped between the RPR and the LAN (local area network), the stations B through D are classified into a group before the congestion point P1, and the stations E through J are classified into a group after the congestion point P1.

Figure 3B:
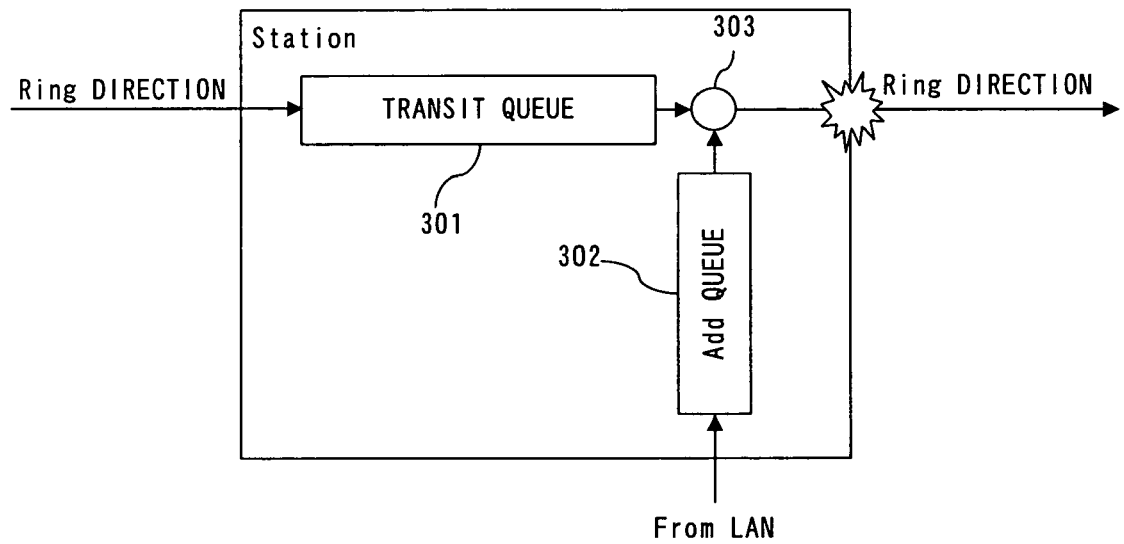
FIG. 3B shows a congestion state.

FIG. 3B is an explanatory view of the congestion state in a station. Each station is provided with a transit queue 301 for holding a frame transferred on the ring, and an add queue 302 for holding a frame incoming to the ring from the LAN. In this case, only one add queue 302 is shown for simplicity.

Scheduler 303 reads the frame of the transit queue 301 by priority over the frame of the add queue 302, and transmits it in the ring direction. Therefore, the remainder obtained by subtracting the traffic rate of the frames read from the transit queue 301 from a predetermined ring band is the traffic rate that can be added from the add queue 302. In this case, the state in which no frames can be added from the add queue 302 is defined as a congestion state.

Figure 4:
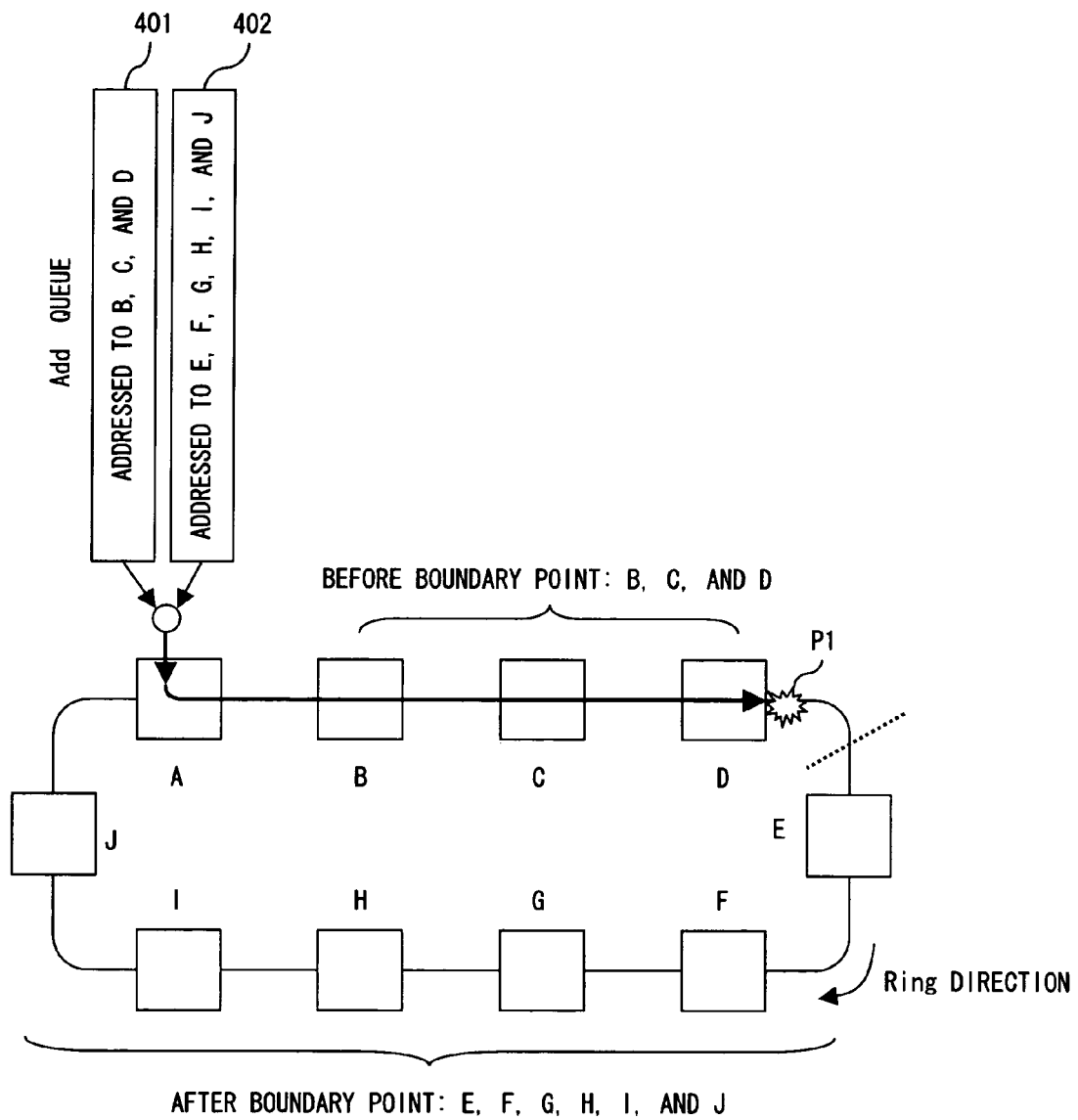
FIG. 4 shows two types of add queues.

FIG. 4 shows two types of add queues 401 and 402 provided for the station A. These add queues correspond to the add queue 302 in FIG. 3B. The station A determines that the station D is a congestion detection station based on the fairness frame received from another station, and defines the point between the station D and the station E as a boundary point. Then, the stations B through J are classified into two groups of the stations B through D (a group before the boundary point) and the stations E through J (a group after the boundary point).

The station A uses the add queue 401 as addressed to the group before the boundary point, and the add queue 402 addressed to the group after the boundary point. It allots a frame transmitted from the LAN to a queue depending on the destination. A frame is transmitted at a full rate assigned to the station A from the add queue 401 of the two add queues, and the transmission rate of the add queue 402 is decreased to the fair rate by shaping. The other station also has two types of add queues as with the station A, and similar fairness control is performed.

Figure 5:
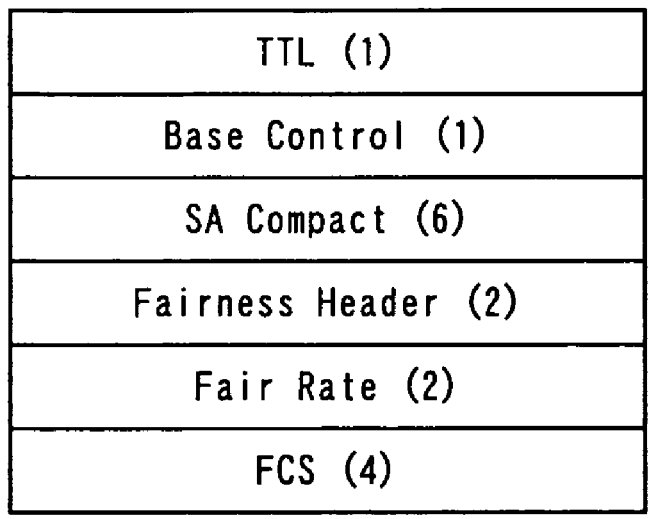
FIG. 5 shows a fairness frame.

FIG. 5 shows the frame format of the fairness frame to be transmitted from each station to another station. The fairness frame shown in FIG. 5 is formed by TTL, base control, SA compact, a fairness header, a fair rate, and FCS. The figures in ( ) indicate the number of bytes.

The TTL indicates the hop count to a destination, the SA compact indicates a source address, the fairness header indicates the type of single choke or multichoke, and the FCS indicates an error correction code (CRC-32) of a payload.

Each station recognizes a congestion point using a fairness frame from a congestion detection station. For example, when a fairness frame in the single choke system is used, a congestion detection station is designated by the TTL in the frame. In this case, the congestion detection station notifies an upstream station by including the number of stations on the ring in the TTL. Upon receipt of the fairness frame, a station compares the congestion state of the station with the fair rate in the fairness frame from the downstream station, and determines a station of heavier congestion as a congestion point.

At this time, if the congestion state of the local station is heavier, it is set that "TTL=the number of stations on the ring" and that "fair rate=detection state of the local station", and the frame is transmitted to an upstream station. If the fair rate in the fairness frame indicates a heavier congestion state, the TTL of the received fairness frame is decreased by 1, the fair rate is maintained as is, and the frame is transmitted to an upstream station.

In which station congestion occurs can be detected by checking the TTL of the fairness frame transmitted from a downstream station because each station knows the number of stations on the ring, and the TTL is decreased for each hop.

Figure 6:
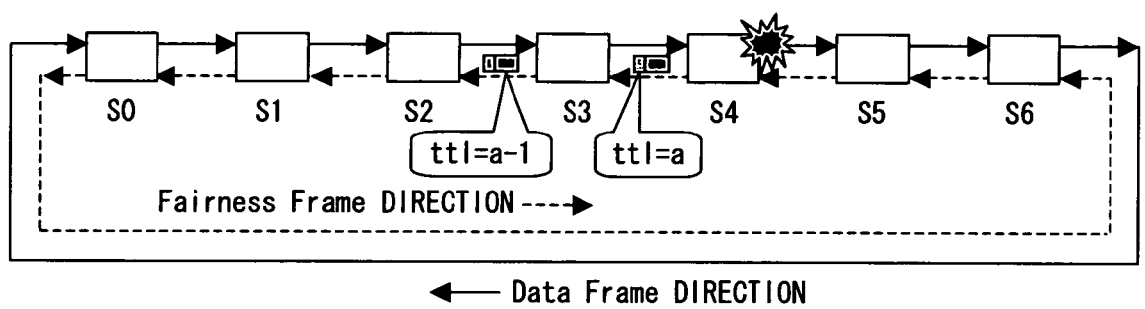
FIG. 6 shows a congestion point determining method.

For example, assuming that the number of stations on the ring is a in the RPR network as shown in FIG. 6, the station S4 which has detected congestion transmits a fairness frame indicating that "TTL=a", and that "fair rate=detection state of the station S4" to the station S3, and the station S3 transmits a fairness frame indicating that "TTL=a1", and that "fair rate=detection state of the station S4" to the station S2. In the station S2, since the TTL of the received fairness frame is a−1, it is recognized that congestion has occurred in the station S4 ahead by two hops.

On the other hand, when a fairness frame in the multichoke system is used, a congestion detection station is designated by the SA compact in the frame.

FIG. 7 shows an example of the configuration of the node device of each station. The node device comprises the traffic reception unit 701, the memory 702, the traffic transmission unit 703, the band control unit 704, a position management table 705, and a fairness frame detection unit 706. The band control unit 704 includes a read control unit 711, a shaper 712, and a management unit 713.

The position management table 705 holds position information indicating to which group each station belongs, a group before the boundary point or a group after the boundary point. For example, the logic "0" is held for the group before the boundary point, and the logic "1" is held for the group after the boundary point as position information.

The position management table 705 is stored in, for example, the memory, and the fairness frame detection unit 706 is configured by, for example, an information processing device having a CPU (central processing unit) and memory.

The traffic transmission unit 703 receives a frame from the LAN, writes the received data to the memory 702, and transfers the pointer (write address and write size) of the memory 702 and the information about the destination station of the received frame to the band control unit 704.

The management unit 713 of the band control unit 704 refers to the position management table 705, and obtains a search result corresponding to the received destination station. If the search result is "0", the destination station is located before the boundary point, and outputs the pointer to the read control unit 711. If the search result is "1", the destination station is located after the boundary point. Therefore, the pointer is output to the shaper 712. The shaper 712 outputs the pointer to the read control unit 711 by shaping the output rate of the pointer to the fair rate.

The operation of directly outputting a pointer to the read control unit 711 from the management unit 713 corresponds to the operation of the add queue 401, and the operation of outputting a pointer through the shaper 712 corresponds to the operation of the add queue 402.

The read control unit 711 performs control of sequentially reading data from the memory 702 according to the received pointer, and the read data is transferred to the traffic transmission unit 703. The traffic transmission unit 703 transmits the received data as a frame to the WAN (on the RPR).

When the boundary point changes depending on the change of the congestion state, the assignment to the two types of add queues is changed by changing the position management table 705. The fairness frame detection unit 706 receives from the WAN a fairness frame from a downstream station, notifies the shaper 712 of a fair rate, and updates the position management table 705.

The fairness frame detection unit 706 determines whether the received fairness frame is a single choke system or a multichoke system, and designates the congestion point based on the TTL or the SA compact. Then, it classifies each station using the congestion point as a boundary point, and updates the position information of the position management table 705. Furthermore, it notifies the shaper 712 of the fair rate from the congestion detection station.

Thus, the fairness frame detection unit 706 selects the heaviest congestion point as a boundary point, and has the function as an update unit for updating the position information about each station in the position management table 705 depending on the selected boundary point.

Next, by referring to FIGS. 8 through 13, the fairness control performed when there are a plurality of congestion points on the RPR is explained below.

First, when the fairness frame is processed in the single choke system, the heaviest congestion point is automatically set as the boundary point. On the other hand, when the fairness frame is processed in the multichoke system, a network manager selects one of the following three types of control methods and applies the selected method. Practically, a control method is selected and set in the node device in advance.

Figure 8:
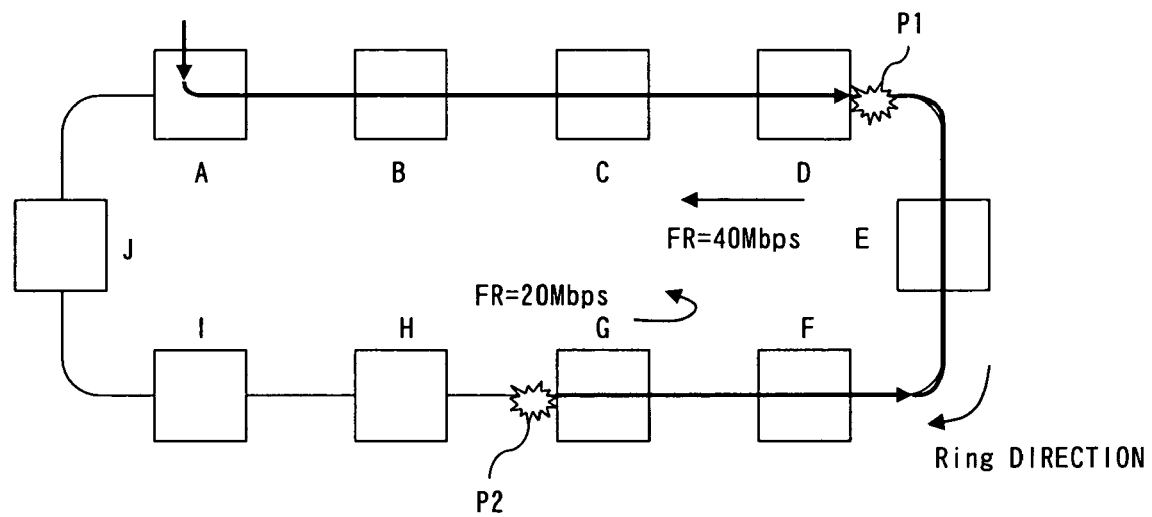
FIG. 8 shows a plurality of congestion points.

As shown in FIG. 8, it is assumed that congestion has occurred at the congestion points P1 and P2, and the fairness frames respectively having the fair rates (FRs) of 40 Mbps and 20 Mbps are transmitted.

At this time, in the control method 1, among a plurality of congestion points, the heaviest congestion point is defined as a boundary point, and the position management table 705 is generated. In the example shown in FIG. 8, the fair rates at the congestion points P1 and P2 are compared. Since the fair rate of the congestion point P2 is lower, it is determined as the heaviest congestion point, and the boundary point is determined between the stations G and H as shown in FIG. 9. The boundary point is not changed while the heaviest congestion is detected between the stations G and H.

In the control method 2, the boundary point is changed at predetermined time intervals so that a plurality of congestion points can be sequentially rotated. However, when there is a point having a heavier congestion than a predetermined threshold (threshold>fair rate), only the point is regarded as a boundary point, and after the relationship of threshold>fair rate is cleared, the boundary point is changed at predetermined intervals. This is the operation for concentrating the control on the band restriction of traffic passing the point with a heavier congestion than the threshold to remove the congestion at the point preferentially.

Figure 10:
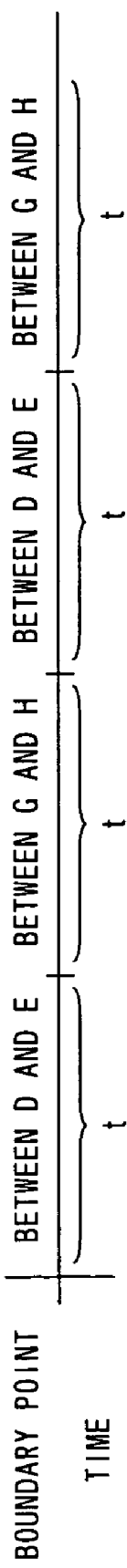
FIG. 10 shows the control method 2 (case 1)
Figure 11:
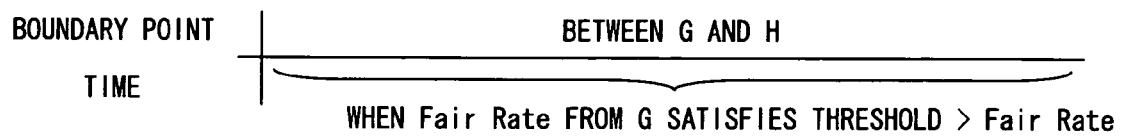
FIG. 11 shows the control method 2 (case 2)

In the example shown in FIG. 8, when the threshold is 20 Mbps or lower, the fair rates of the congestion points P1 and P2 satisfy the relationship of threshold≦fair rate. Therefore, as shown in FIG. 10, the point between the stations D and E and the point between the stations G and H are switched at predetermined time t. Furthermore, when the threshold is larger than 20 Mbps, the fair rate of the congestion point P2 is lower than the threshold. Therefore, as shown in FIG. 11, the point between the stations G and H is defined as a boundary point. In this case, the boundary point is not changed while the fair rate of the congestion point P2 is lower than the threshold.

In the control method 3, the boundary point is changed by converting the fair rate from each congestion detection station to time, and a plurality of congestion points can be sequentially rotated based on the obtained time. As in the control method 2, when there is a point where threshold>fair rate, only the point is regarded as a boundary point. After the relationship of threshold>fair rate is cleared, the boundary point is changed based on the time.

In the example shown in FIG. 8, by the conversion expression of time (ms)=100000000/fair rate (bps), the fair rate of the congestion points P1 and P2 are respectively converted as follows.

$P1: 100000000/40 M=2.5 (ms)$ $P2: 100000000/20 M=5.0 (ms)$

Figure 12:
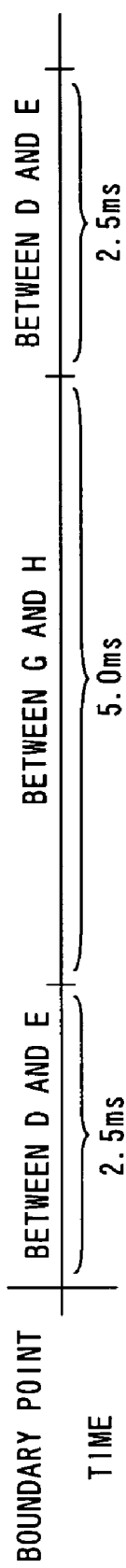
FIG. 12 shows the control method 3 (case 1)
Figure 13:
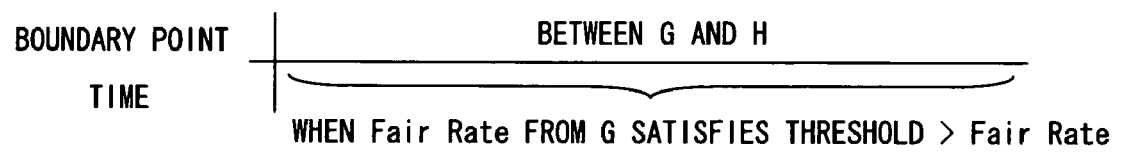
FIG. 13 shows the control method 3 (case 2)

When the threshold is 20 Mbps or lower, the fair rates of the congestion points P1 and P2 satisfy the relationship of threshold≦fair rate. As shown in FIG. 12, a point between the stations D and E is set as a boundary point for 2.5 ms. In the next 5 ms, a point between the stations G and H is set as a boundary point. This control is repeated. If the threshold is larger than 20 Mbps, the fair rate of the congestion point P2 is smaller than the threshold. Therefore, as shown in FIG. 13, a point between the stations G and H is set as a boundary point.

As described above, by preparing a plurality of control methods, more effective control can be performed depending on the features of the operated network. For example, in a network in which there is heavy traffic from a station to the RPR, the control method 1 in which the heaviest congestion point is a boundary point is simple and effective. In a network in which a plurality of stations are to narrow a band by the same degree of rate, the control method 2 in which the boundary point rotates at predetermined intervals is simple and effective.

On the other hand, the control method 3 in which a boundary point is changed by weighting a rate is complicated, but can allow the congestion level to be reflected in switch time. Therefore, a more appropriate rate restriction can be realized.

In the control methods 2 and 3, the fair rate is compared with the threshold to determine whether or not a boundary point is to be rotated, thereby performing control for each congestion point by the rotation in case of light congestion, and performing concentrated control on a point with serious congestion exceeding a predetermined level.

Furthermore, in the control methods 2 and 3, it is possible not to add the congestion occurring at a point beyond the heaviest congestion point to the rotation. Thus, full rate traffic does not flow into the heaviest congestion point, thereby realizing appropriate congestion control.

Each of the above-mentioned control methods is described below in more detail by referring to FIGS. 14 through 17.

Figure 14:
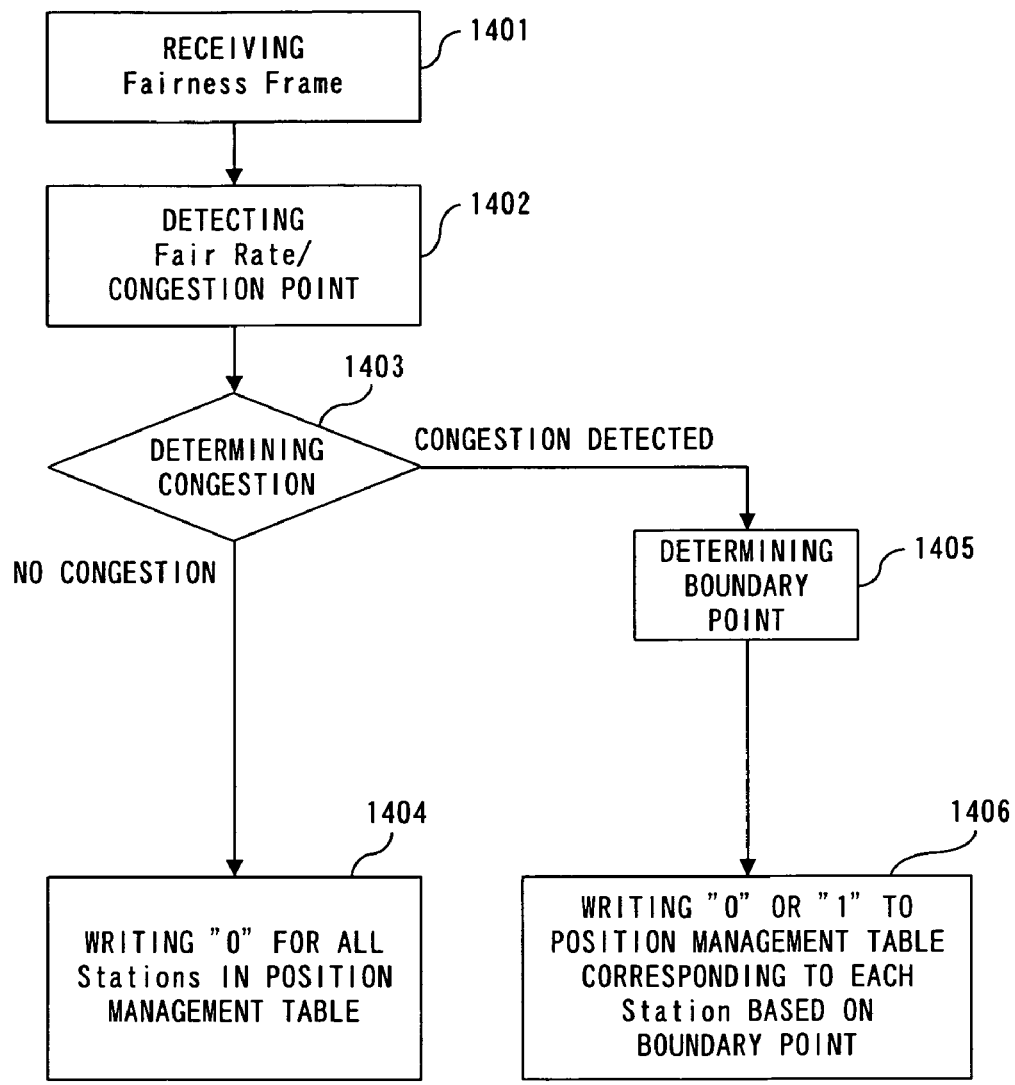
FIG. 14 is a flowchart of the control in the case of a fairness frame in a single choke system.

FIG. 14 is a flowchart of the operation of the fairness frame detection unit 706 when a fairness frame is processed in the single choke system. Upon receipt of a fairness frame from an adjacent downstream station, the fairness frame detection unit 706 resets the operation (step 1401). Next, it extracts the fair rate and the TTL from the received fairness frame, and detects a congestion point from the extracted information and the congestion state of the local station (step 1402).

Next, the presence/absence of congestion is determined depending on whether or not a congestion point is detected (step 1403). If there is no congestion, "0" is written to the position information of all stations in the position management table 705 (step 1404). If there is congestion, the congestion point is determined as a boundary point (step 1405), and "0" or "1" is written to the position information of each station in the position management table 705 depending on the position before or after the boundary point (step 1406).

Figure 15:
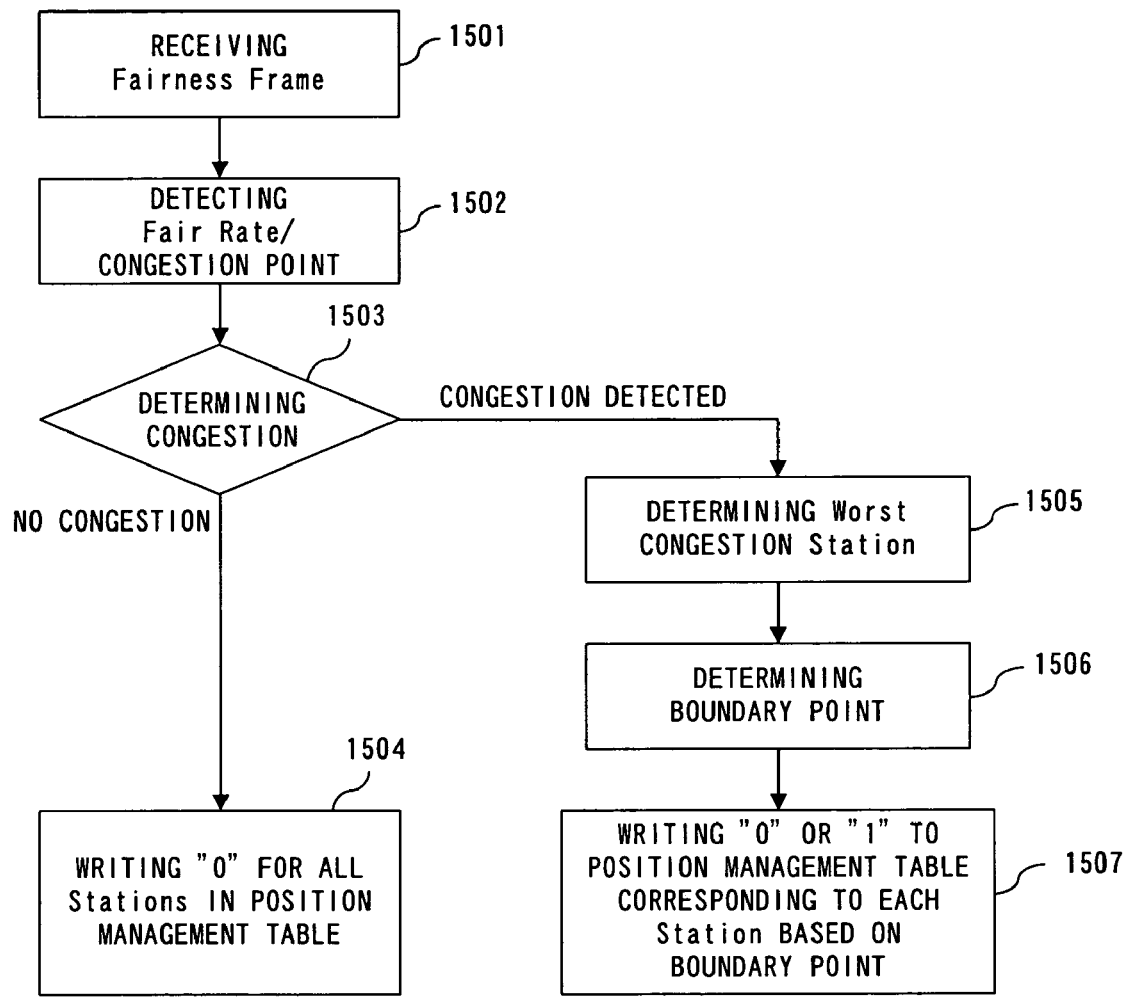
FIG. 15 is a flowchart of the control method 1.
Figure 16:
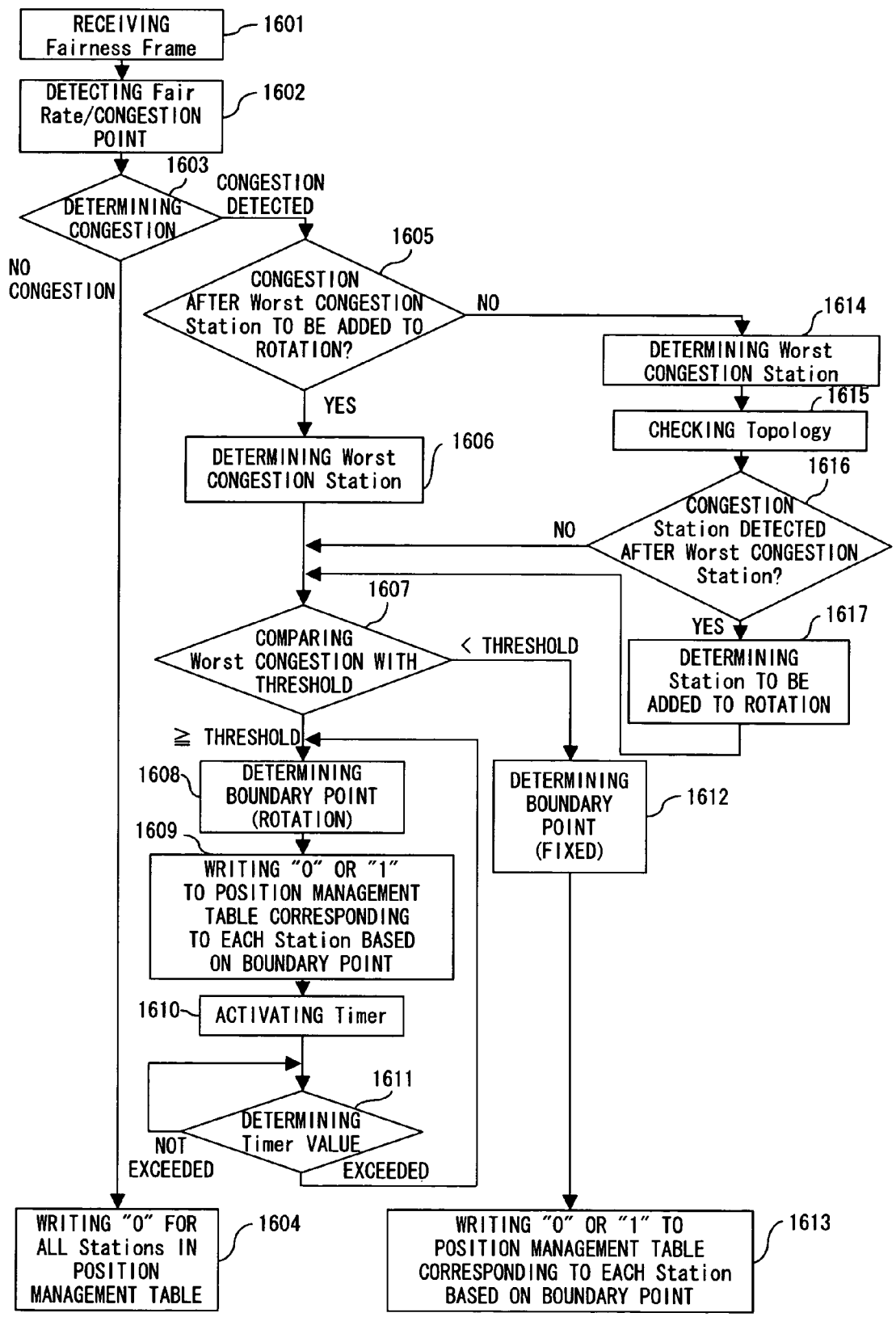
FIG. 16 is a flowchart of the control method 2.
Figure 17:
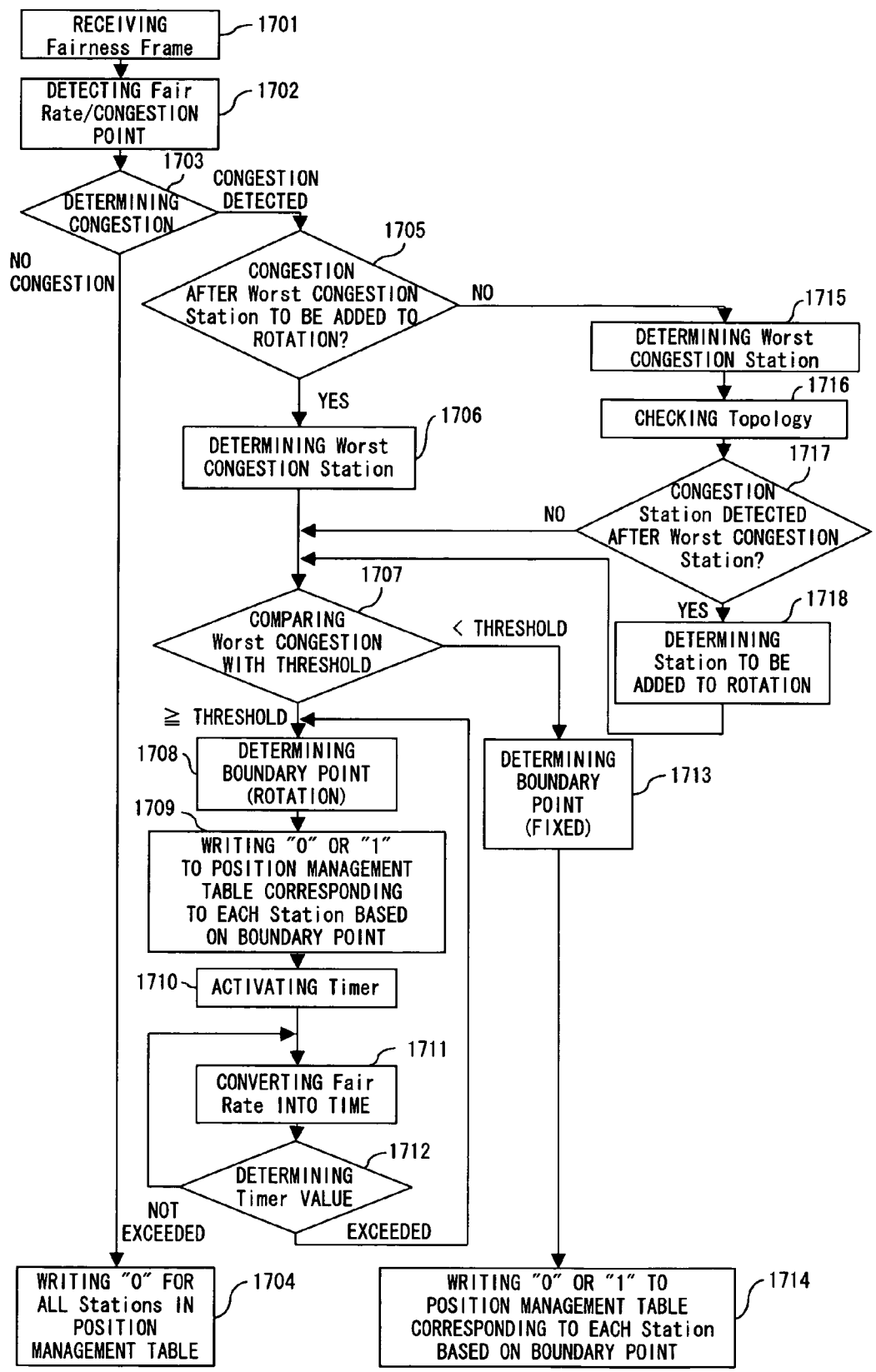
FIG. 17 is a flowchart of the control method 3.

FIGS. 15 through 17 are flowcharts of the operations of the fairness frame detection unit 706 when a fairness frame is processed in the multichoke system.

In the case of the control method 1, the fairness frame detection unit 706 performs the operation as shown in FIG. 15. Upon receipt of a fairness frame from all stations but the local station, the fairness frame detection unit 706 resets the operation (step 1501). Next, a fair rate and SA compact are extracted from each of the received fairness frames, and one or more congestion points are detected from the extracted information and the congestion state of the local station (step 1502).

Next, the presence/absence of congestion is determined depending on whether or not a congestion point has been detected (step 1503). If there is no congestion, "0" is written to the position information of all stations in the position management table 705 (step 1504). If there is congestion, the worst station with the heaviest congestion is determined from the received fair rate of each station and the congestion state of the local station (step 1505). Then, a point between the worst congestion station and the farther adjacent station is determined as a boundary point (step S1506), and "0" or "1" is written to the position information of each station in the position management table 705 depending on whether the point is before or after the boundary point (step 1507).

In the case of the control method 2, the fairness frame detection unit 706 performs the operation as shown in FIG. 16. In FIG. 16, the operations in steps 1601 through 1604 are the same as the operations in steps 1501 through 1504 shown in FIG. 15, and the operations in steps 1609 and 1613 are the same as the operation in step 1507 shown in FIG. 15.

When there is congestion in step 1603, the fairness frame detection unit 706 determines whether or not a congestion point beyond the worst congestion station is to be added to the rotation (step S1605).

If the congestion point beyond the station is to be added to the rotation, the worst congestion station is determined from the received fair rate of each station and the congestion state of the local station (step 1606), and a predetermined threshold is compared with the fair rate of the worst congestion station (step 1607).

If the fair rate of the worst congestion station is equal to or higher than the threshold, then a boundary point is determined from the rotation (step 1608), and the position information is written to the position management table 705 (step 1609). Then, the timer is activated to start counting (step 1610), and it is determined whether or not the timer value exceeds a set time (step 1611). If the timer value exceeds the set time, the operations in and after step 1608 are repeated.

If the fair rate of the worst congestion station is smaller than the threshold in step 1607, a point between the worst congestion station and the farther adjacent station is determined as a boundary point (step 1612), and the position information is written to the position management table 705 (step 1613).

In step 1605, if the congestion point beyond the worst congestion station is not added to the rotation, the worst congestion station is determined as in step 1606 (step 1614), and the ring topology of the RPR is checked (step 1615). In this case, the positional relationship between the worst and another congestion points is checked. The ring topology used in the check has already been grasped by each station communicating a control frame independent of the fairness control.

Next, it is determined based on the check result whether or not there is a congestion station beyond the worst congestion station (step 1616). If there is no further congestion station, the operations in and after step 1607 are performed. If there is a further congestion station, congestion stations other than the congestion station are determined to be added to the rotation, and the operations in and after step 1607 is performed.

In the case of the control method 3, the fairness frame detection unit 706 performs the operation as shown in FIG. 17. In FIG. 17, the operations in steps 1701 through 1710 are the same as the operations-in steps 1601 through 1610 shown in FIG. 16.

When the timer is activated in step 1710, the fairness frame detection unit 706 converts the fair rate of the congestion point determined as a boundary point into time, and sets it in the timer, thereby starting the count (step 1711). The operations in steps 1712 through 1718 are the same as the operations in steps 1611 through 1617 shown in FIG. 16.

What is claimed is:

1. A node device which adds a frame external to a ring-shaped packet communication network formed by a plurality of stations which transfer a data frame, to the communication network at a station in the communication network, comprising:

a reception device for receiving an external frame;

a storage device for storing a received frame;

a control device for reading from the storage device at a first transfer rate a frame addressed to a station located before a boundary point which is a congestion point on the communication network, and reading a frame addressed to a station located after the boundary point from the storage device at a second transfer rate lower than the first transfer rate; and a transmission device for transmitting a read frame to the communication network.

2. The node device according to claim 1, wherein
    the control device reads from the storage device at a full rate the frame addressed to the station located before the boundary point, and reads the frame addressed to the station after the boundary point from the storage device according to a fair rate notified by a fairness frame from a downstream station.

3. The node device according to claim 1, further comprising
    a position management table for storing position information indicating whether each station on the communication network is located before or after the boundary point, wherein
    the control device refers to the position management table, and determines whether a transfer rate at which each frame is read from the storage device is the first transfer rate or the second transfer rate.

4. The node device according to claim 3, further comprising
    an update unit for selecting a heaviest congestion point as the boundary point when there are a plurality of congestion points in the communication network and updating position information of each station in the position management table depending on the selected boundary point.

5. The node device according to claim 3, further comprising
    an update unit for changing the boundary point at predetermined intervals such that a plurality of congestion points are sequentially rotated when there are the plurality of congestion points in the communication network and updating position information of each station in the position management table depending on a selected boundary point.

6. The node device according to claim 5, wherein
    the update unit does not add a congestion point located after the heaviest congestion point among the plurality of congestion points to rotation.

7. The node device according to claim 3, further comprising
    an update unit for converting a fair rate notified by a fairness frame from a station which detects each congestion point into time when there are a plurality of congestion points in the communication network, changing the boundary point such that each congestion point can be sequentially rotated depending on obtained time, and updating position information of each station in the position management table based on a selected boundary point.

8. A control method for adding a frame external to a ring-shaped packet communication network formed by a plurality of stations which transfer a data frame, to the communication network at a station in the communication network, comprising:

receiving an external frame and storing the external frame in a storage device;

reading from the storage device at a first transfer rate a frame addressed to a station located before a boundary point which is a congestion point on the communication network, and reading a frame addressed to a station located after the boundary point from the storage device at a second transfer rate lower than the first transfer rate; and transmitting a read frame to the communication network.

9. A node device which adds a frame external to a ring-shaped packet communication network formed by a plurality of stations which transfer a data frame, to the communication network at a station in the communication network, comprising:

a reception device for receiving an external frame;

a first storage device for transferring a stored frame to the ring-shaped packet communication network at a first transfer rate;

a second storage device for transferring a stored frame at a second transfer rate lower than the first transfer rate to the ring-shaped packet communication network; and a control device for storing an external frame addressed to a station located before a boundary point which is a congestion point in the communication network in the first storage device, and storing an external frame addressed to a station located after the boundary point in the second storage device.

* * * * *